US012762018B2

(12) United States Patent
Nisar et al.

(10) Patent No.: US 12,762,018 B2
(45) Date of Patent: Oct. 13, 2026

(54) OPERATING SYSTEM BACKUP AND RESTORATION USING ARTIFICIAL INTELLIGENCE TECHNIQUES

(71) Applicant: Dell Products L.P., Round Rock, TX (US)

(72) Inventors: Furkan Mohd Nisar, Ambedkar Nagar (IN); Balakrishna Nallavadla, Bangalore (IN); Abhishek Mishra, Bangalore (IN); Vivek Bhargava, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/984,144

(22) Filed: Dec. 17, 2024

(65) Prior Publication Data

US 2026/0169860 A1 Jun. 18, 2026

(51) Int. Cl.
*G06F 11/1446* (2026.01)

(52) U.S. Cl.
CPC ...... *G06F 11/1446* (2013.01); *G06F 11/1469* (2013.01)

(58) Field of Classification Search
None
See application file for complete search history.

(56) References Cited

U.S. PATENT DOCUMENTS 7,721,138 B1 5/2010 Lyadvinsky et al.
8,990,613 B2 3/2015 Bensinger
9,176,823 B2 11/2015 Bensinger
(Continued)

FOREIGN PATENT DOCUMENTS

CN 117891660 A * 4/2024 .......... G06F 11/1469

OTHER PUBLICATIONS

Jscher2000. Comment on post "How to backup preferences / options and UI customization ?" Dec. 2015. https://support.mozilla.org/bm/questions/1098998.*

(Continued)

*Primary Examiner* — Nathan Sadler

(74) *Attorney, Agent, or Firm* — Ryan, Mason & Lewis, LLP

(57) ABSTRACT

Methods, apparatus, and processor-readable storage media for operating system backup and restoration using artificial intelligence techniques are provided herein. An example computer-implemented method includes processing at least a portion of data structures including data pertaining to user interface elements in connection with at least one user device and at least one application; identifying patterns across multiple user devices and the application(s) by processing usage data, associated with the multiple user devices and the application(s), using artificial intelligence techniques; automatically executing, in connection with operating system modifications associated with the user device(s), data backup operations related to the application(s) based on the processing of the data pertaining to the user interface elements and at least one of the patterns; and automatically executing one or more data restoration operations including restoring at least a portion of data, stored as part of the data backup operations, to the user device(s) and/or the application(s).

20 Claims, 13 Drawing Sheets

(56) References Cited

U.S. PATENT DOCUMENTS

| | | | | |
|---|---|---|---|---|
| 10,019,324 | B2 | 7/2018 | Bensinger | |
| 11,561,701 | B2 * | 1/2023 | Singh | G06N 20/00 |
| 2007/0250671 | A1 | 10/2007 | Lyon | |
| 2008/0250085 | A1 | 10/2008 | Gray et al. | |
| 2018/0329993 | A1 * | 11/2018 | Bedadala | G06F 16/90332 |
| 2022/0366296 | A1 * | 11/2022 | Oruganti | G06F 11/1438 |
| 2023/0185674 | A1 * | 6/2023 | Manley | G06F 11/1461 707/654 |
| 2025/0004886 | A1 * | 1/2025 | Wuest | G06F 11/1469 |

OTHER PUBLICATIONS

Translation of CN-117891660-A. 2025.*

* cited by examiner

300

```
def collect_user_data():
    # Collect metadata from user interactions
    data = []
    for session in user_sessions:
        ui_actions = log_ui_actions(session)  # Capture clicks,
scrolls, selections
        metadata = extract_metadata(ui_actions)  # E.g.,
timestamps, widget usage
        data.append(metadata)
    return data
```

FIG. 3

400

```
def preprocess_data(data):
   processed_data = []
   for record in data:
      processed_record = normalize(record)  # Scale values,
encode features
      processed_data.append(processed_record)
   return processed_data
```

FIG. 4

500

```
def train_seq2seq_model(data):
   input_sequences, output_sequences =
prepare_sequences(data)  # Prepare input-output pairs
   model = Seq2Seq(input_dim, hidden_dim, output_dim)  #
Define Seq2Seq model
   model.compile(optimizer='adam',
loss='categorical_crossentropy')
   model.fit(input_sequences, output_sequences, epochs=50,
batch_size=32)
   return model
```

FIG. 5

700

```
def load_model(path):
    return keras.models.load_model(path)
```

FIG. 7

800

```
def monitor_user_interaction():
    ui_actions = get_real_time_actions()  # E.g., clicks, scrolls,
widget use
    metadata = extract_metadata(ui_actions)  # Extract relevant
features
    return metadata
```

FIG. 8

900

```
def predict_ui_adjustments(model, metadata):
    input_sequence = prepare_input_sequence(metadata)  #
Prepare input for the model
    predicted_output = model.predict(input_sequence)  #
Generate UI adjustments
    return decode_predictions(predicted_output)
```

FIG. 9

1000

```
def update_ui_layout(predictions):
    for element, new_config in predictions.items():
        update_element_config(element, new_config)
```

FIG. 10

OPERATING SYSTEM BACKUP AND RESTORATION USING ARTIFICIAL INTELLIGENCE TECHNIQUES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Operating systems commonly require updates, upgrades and/or reinstallations. However, conventional processes typically fail to maintain all relevant data during such operations, leading to errors, latencies, and resource-intensive corrective actions.

SUMMARY

Illustrative embodiments of the disclosure provide techniques for operating system backup and restoration using artificial intelligence techniques.

An exemplary computer-implemented method includes processing at least a portion of one or more data structures including data pertaining to one or more user interface elements in connection with at least one user device and at least one application, and identifying one or more patterns across multiple user devices and the at least one application by processing usage data, associated with the multiple user devices and the at least one application, using one or more artificial intelligence techniques. The method also includes automatically executing, in connection with one or more operating system modifications associated with the at least one user device, one or more data backup operations related to the at least one application based at least in part on the processing of the data pertaining to the one or more user interface elements and at least one of the one or more identified patterns. Additionally, the method includes automatically executing, in connection with the one or more operating system modifications associated with the at least one user device, one or more data restoration operations including restoring at least a portion of data, stored as part of the one or more data backup operations, to one or more of the at least one user device and the at least one application.

Illustrative embodiments can provide significant advantages relative to conventional system management techniques. For example, problems associated with errors, latencies, and resource-intensive corrective actions are overcome in one or more embodiments through automatically configuring and initiating data backup and data restoration operations, in connection with operating system modifications, using artificial intelligence techniques.

These and other illustrative embodiments described herein include, without limitation, methods, apparatus, systems, and computer program products comprising processor-readable storage media.

BRIEF DESCRIPTION OF THE DRAWINGS

FIG. 3 shows example pseudocode for implementing data collection techniques in connection with training an artificial intelligence-based user-application pattern identification engine in an illustrative embodiment.

FIG. 4 shows example pseudocode for implementing data preprocessing techniques in connection with training an artificial intelligence-based user-application pattern identification engine in an illustrative embodiment.

FIG. 5 shows example pseudocode for training at least a portion of an artificial intelligence-based user-application pattern identification engine in an illustrative embodiment.

FIG. 7 shows example pseudocode for loading at least a portion of an artificial intelligence-based user-application pattern identification engine in an illustrative embodiment.

FIG. 8 shows example pseudocode for capturing input data in connection with implementing at least a portion of an artificial intelligence-based user-application pattern identification engine in an illustrative embodiment.

FIG. 9 shows example pseudocode for predicting user interface (UI) adjustments using the trained artificial intelligence-based user-application pattern identification engine in an illustrative embodiment.

FIG. 10 shows example pseudocode for dynamically reconfiguring UI layout based on artificial intelligence-based predictions in an illustrative embodiment.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
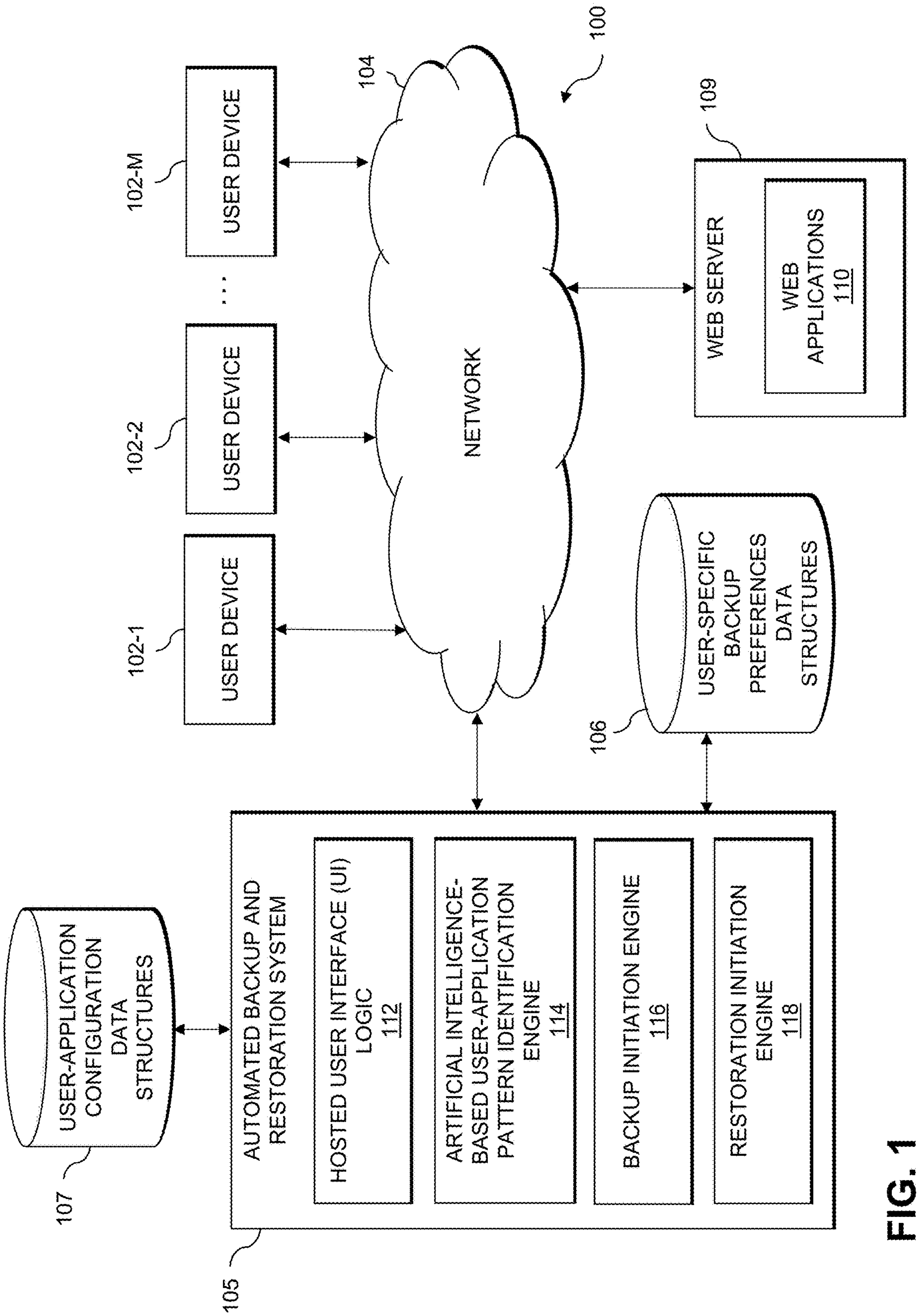
FIG. 1 shows an information processing system configured for operating system backup and restoration using artificial intelligence techniques in an illustrative embodiment.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is automated backup and restoration system 105 and web server 109, upon which one or more web applications 110 execute.

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, the automated backup and restoration system 105 can have one or more user-application configuration data structures 107 configured to store data pertaining to various applications (e.g., versioning information, user-provided data, etc.) as well as information pertaining to application backup operations (e.g., temporal information, frequency information, etc.). Also, the automated backup and restoration system 105 can have one or more user-specific backup preferences data structures 106 configured to store data pertaining to various users and preferences thereof related to application backup operations (e.g., particular types of data to be backed up, temporal preferences, frequency preferences, etc.). The term "data structure," as used herein, is intended to be broadly construed, so as to encompass, for example, a wide variety of different types of tables, arrays, graphs, trees, linked lists, and additional or alternative data relation mechanisms, as well as portions or combinations thereof. Accordingly, a given data structure can comprise a combination of multiple smaller data structures, possibly of different types, or a portion of a larger data structure. Numerous other arrangements are possible.

The user-application configuration data structures 107 and/or user-specific backup preferences data structures 106 in the present embodiment is implemented using one or more storage systems associated with the automated backup and restoration system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the automated backup and restoration system 105 are one or more input-output devices, which illustratively comprise keyboards, displays or other types of input-output devices in any combination. Such input-output devices can be used, for example, to support one or more UIs to the automated backup and restoration system 105, as well as to support communication between the automated backup and restoration system 105 and other related systems and devices not explicitly shown.

Additionally, the automated backup and restoration system 105 in the FIG. 1 embodiment is assumed to be implemented using at least one processing device. Each such processing device generally comprises at least one processor and an associated memory, and implements one or more functional modules for controlling certain features of the automated backup and restoration system 105.

More particularly, the automated backup and restoration system 105 in this embodiment can comprise a processor coupled to a memory and a network interface.

The processor may comprise, for example, a microprocessor, an application-specific integrated circuit (ASIC), a system-on-chip (SOC), a field-programmable gate array (FPGA), a central processing unit (CPU), a graphics processing unit (GPU), a neural processing unit (NPU), a data processing unit (DPU), a tensor processing unit (TPU), an arithmetic logic unit (ALU), a digital signal processor (DSP), and/or other similar processing device components, as well as other types and arrangements of processing circuitry, in any combination. At least a portion of the functionality of at least one artificial intelligence system and its associated artificial intelligence algorithms provided by one or more processing devices as disclosed herein can be implemented using such circuitry.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows the automated backup and restoration system 105 to communicate over the network 104 with the user devices 102, and illustratively comprises one or more conventional transceivers.

The automated backup and restoration system 105 further comprises hosted UI logic 112, artificial intelligence-based user-application pattern identification engine 114, backup initiation engine 116, and restoration initiation engine 118.

In one or more embodiments, hosted UI logic 112 can be implemented to automatically configure the appearance of elements on UIs in one or more web applications based at least in part on stored settings. Accordingly, in such an embodiment, users will not experience frequent changes in its corresponding web application layout. Additionally, in at least one embodiment, artificial intelligence-based user-application pattern identification engine 114 processes data pertaining to both users and applications to detect and/or identify patterns across those entities. Also, in such an embodiment, backup and/or recovery processes for specific applications are only initiated when necessary, and such determinations are made based at least in part on leveraging the patterns identified by artificial intelligence-based user-application pattern identification engine 114. Such a precaution ensures that only designated (e.g., essential) operations are activated, reducing the possibility of unauthorized access by bad actors.

Further, in one or more embodiments, backup initiation engine 116 activates one or more application and/or data backup processes. For example, when a given backup process is proposed by the backup initiation engine 116, a user approves the backup process, which is then automatically commenced by backup initiation engine 116, which can include saving the given application and/or data to at least one designated location. Additionally, in at least one embodiment, restoration initiation engine 118 automatically commences and/or carries out a restoration process by, for example, locating particular backup items and placing the items in correct positions, replicating how the items were arranged and/or configured at the time of the corresponding backup process.

It is to be appreciated that this particular arrangement of elements 112, 114, 116 and 118 illustrated in the automated backup and restoration system 105 of the FIG. 1 embodiment is presented by way of example only, and alternative arrangements can be used in other embodiments. For example, the functionality associated with elements 112, 114, 116 and 118 in other embodiments can be combined into a single module, or separated across a larger number of modules. As another example, multiple distinct processors can be used to implement different ones of elements 112, 114, 116 and 118 or portions thereof.

At least portions of elements 112, 114, 116 and 118 may be implemented at least in part in the form of software that is stored in memory and executed by a processor.

It is to be understood that the particular set of elements shown in FIG. 1 for configuring and implementing operating system backup and restoration operations using artificial intelligence techniques involving user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, two or more of automated backup and restoration system 105, user-application configuration data structures 107, user-specific backup preferences data structures 106, and web server 109 can be on and/or part of the same processing platform.

An exemplary process utilizing elements 112, 114, 116 and 118 of an example automated backup and restoration system 105 in computer network 100 will be described in more detail with reference to the flow diagram of FIG. 11.

Accordingly, at least one embodiment includes operating system backup and restoration using artificial intelligence techniques. Such an embodiment includes learning and/or determining behavioral patterns and circles of interest of one or more users, including information pertaining to what actions the user routinely performs in connection with one or more applications, one or more customized settings utilized by one or more users across one or more applications, etc. Such information can be obtained, for example, through user intent-based provisioning metadata.

Additionally, one or more embodiments include learning and/or determining application information pertaining to usage, such as, for example, which application(s) require(s) restoring and prebuilding of customized settings for one or more users. Such information can be obtained, e.g., via application monitoring data and/or natural language-based descriptions for various application analytics. Further, at least one embodiment includes generating and/or implementing an artificial intelligence-based restoration system that can identify and restore critical application data based on user-specific information and/or application usage information.

As detailed herein, one or more embodiments include information gathering techniques which can include obtaining data pertaining to user behavior in connection with one or more applications, user interests expressed across the one or more applications, user routines in connection with the one or more applications, etc. Such information gathering can be carried out, for example, by utilizing user intent-based provisioning metadata, focusing on identifying frequently accessed applications and/or settings, as well as analyzing personalized configurations, saved files, application-specific data, etc. to learn and/or determine one or more user preferences. Such an embodiment can also include extracting information pertaining to application controls, application preferences, mapped network drives, email signatures, notes, time zone settings, cache data, bookmarks, and/or user-specific configurations from monitoring data.

Additionally, at least one embodiment includes enabling and/or facilitating user customization of backup preferences, ensuring alignment with user needs and/or requirements. By collecting data on user behavior patterns, circles of interest, routine activities, etc., along with identifying frequently accessed applications and settings, such an embodiment includes creating and/or implementing a targeted and efficient backup and restoration processes. As such, the user can make an informed decision about a restoration and/or other outcome(s) without needing to understand all of the related technical details. More particularly, such an embodiment can include determining, and outputting to the user, what effort is involved, what backups are needed, how much time each task will take, any underlying gaps in the backup, what is not included, how many manual steps are necessary, etc.

Accordingly, at least one embodiment includes creating a backup report that identifies what data is included in the backup to enhance transparency and user confidence. Such an embodiment can also include indicating in the backup report what data is not included in the backup, specifying one or more exclusion criteria corresponding thereto. Users can then check and/or validate the backup report, which also provides one or more customization options to suit one or more user preferences, providing the users the ability to make choices prior to the restoration and/or while the restoration is underway.

By implementing background processes for data collection and analysis, in conjunction with implementing one or more data compression techniques to reduce backup file sizes, one or more embodiments enhance the overall backup and restoration process. Such enhancements can facilitate users' ability to continue with primary tasks without interruption while efficiently managing storage space through compressed backup files. In one or more embodiments, the data that is backed up can be stored in at least one cloud platform service (e.g., a secure online storage space), and only one or more designated users (e.g., the user who owns the data) can access this storage (e.g., using a username and password and/or other authentication information).

One or more embodiments can include use hybrid data compression approaches that combine multiple techniques to take advantage of various strengths and/or features. By way of example, such an embodiment can include using a compression and encryption combination technique, which reduces the amount of data without sacrificing any information. This can be important for items such as, e.g., metadata, configuration files, and/or other data that needs to be recovered flawlessly during restoration processes. Such an embodiment can include, for example, using a Deflate technique which combines Huffman coding and LZ77 and/or LZ78 for effective data compression. Huffman coding efficiently compresses data by assigning shorter codes to frequent items, while LZ77 and/or LZ78 replaces one or more repetitive sequences with references in at least one dictionary. Such an embodiment can also include encrypting the data using, e.g., the advanced encryption standard (AES) cryptographic algorithm, which helps to improve performance while keeping the data secure.

As detailed herein, one or more embodiments include determining user usage patterns and generating profiles related thereto. Different application users can express and/or produce differences with respect to utilizing the same application and working on different respective user devices. Such utilization can be linked with a corresponding user identifier and can be specific to one or more user controls and/or one or more application profiles. For example, consider two users, User A and User B, working on a presentation application. User A and User B may have different personalized settings (e.g., a particular screen layout, font size, default transition effects, etc.), and by preserving such details for each user, in the event of an operating system upgrade, both users can restore their preferred working environment.

Also, in connection with such user differences, at least one embodiment can include generating and/or implementing an efficient mechanism (e.g., a single click option) for restoring application data identified in a discovery stage (such as detailed above and herein). For instance, there may be times when users want to limit backup operations based on context. Accordingly, one or more embodiments include providing and/or implementing multi-part context-aware backup and/or restoration options for users.

As described above and further detailed herein, at least one embodiment includes identifying and/or discovering user-specific application data, which can then be leveraged to determine and/or prioritize application data in backup and/or restoration operations. Such user-specific application data can include, for example, page view data, user activity data within the applications, event data, error data, information pertaining to one or more user devices and operating systems, etc. For example, such an embodiment can include processing data pertaining to a user's behavior during installation and use of a given application. Such data can include and/or indicate one or more common directories and/or files that the user stores and/or utilizes for collections, configurations, and settings. As such, one or more embodiments can include initiating (e.g., advising the user) backup operations of at least the commonly used directories and/or files of the application. Additionally, such an embodiment can also include initiating (e.g., advising the user) backup operations of one or more other directories and/or files of the application identified via processing of data pertaining to one or more other and/or similar users with respect to the application.

At least one embodiment can further include generating and/or maintaining at least one application profile data repository, which can contain information, for example, pertaining to the primary purpose of the application (e.g., genres such as development and operations, source administrator tool, software publishing, etc.), application data and usage patterns, entities managed by the application (e.g., user settings, updates and saving patterns, etc.), and operations data (e.g., perform, view, edit, open, etc.). Such information can be mappable to one or more intent-based application programming interfaces (APIs).

By interacting with user intents and context, intent-based APIs provide a cohesive and flexible user experience. For example, at least one embodiment can include using a similar application setting API, which enables monitoring and/or determining if a user's previous application settings on a different device and/or in a different session match the current device's and/or current session's configuration. Additionally or alternatively, at least one embodiment can include using a same access control API, which can ensure that users' access control settings (e.g., permissions, roles, etc.) are replicated across different devices when restoring application data. Further still, another example can include a data backup API, which is used to restore application data such as settings, files, configurations, etc. from a backup location (e.g., cloud storage, external drives) to the user's current environment.

For example, a task tracker application profile data repository can direct a backup procedure by highlighting components such as, e.g., task lists, individual tasks, due dates, user settings, completion status of the application, etc., such that the backup procedure is customized to one or more user preferences, one or more usage habits, and/or the particular data that the application manages.

Additionally, one or more embodiments can also include determining and/or leveraging information pertaining to the typical amount of time taken for one or more operations, including one or more exception conditions. In such an embodiment, exception conditions (e.g., approval not given) can be mappable to one or more intent-based APIs and/or one or more user-focused APIs. As used herein, user-focused APIs refer to functionalities within an application that are designed to educate and/or engage users. For example, users may be asked to provide approval to proceed with one or more backup operations. If the user declines to provide approval for the backup operation, the operation cannot proceed. The exception condition of "Approval Not Given" can then be addressed through one or more intent-based APIs and/or one or more user-focused APIs, ensuring that the users are informed about the significance of the backup operation and data protection.

Additionally, as detailed herein, one or more embodiments include discovering and/or identifying backup-related and/or restoration-related activity with respect to at least one user and at least one application. Such an embodiment can include tracking actions and activity of multiple users across multiple applications in connection with one or more user devices. Such tracking can include, for example, registering with one or more operating system channels and monitoring and/or listening to the activity coming from the applications. Such tracking can also include, e.g., implementing a plugin to an operating system graphical user interface (GUI) software development kit (SDK), and using the plugin to intercept controls and identify data entered by users, maintain only such data that is relevant for the users. Additionally, such tracking can include, for example, implementing at plugin to one or more log storages to initiate a backup process of historical log information and determine at least one mechanism to increase or decrease the log level.

In one or more embodiments, only metadata is captured during such tracking procedures, wherein instead of the actual content that the users enter, the metadata refers to condensed information about the users' actions. For example, instead of saving the entire text of an email or document, such an embodiment can include capturing and tracking related metadata such as, e.g., timestamps, file names, formatting preferences, and collaboration history.

At least one embodiment includes monitoring and processing data pertaining to one or more system events and triggers. Such data can include, for example, changes to one or more directories (such as, e.g., a root directory) which can be related to at least one upgrade process, changes in a Windows Registry related to updates or system modifications, and/or signals related to an operating system upgrade which can serve as a trigger for a backup system.

One or more embodiments can also include determining and/or deriving one or more user application usage patterns and/or profiles to build at least one context and intent repository. Such an embodiment includes collecting metadata related to user activity in connection with a given application in question, as well as metadata from other relevant applications. Collecting such metadata can be carried out using one or more APIs provided by one or more relevant systems.

Additionally, in at least one embodiment, a user reprovisioning context and intent repository can be used in connection with a variety of actions. Such actions can include, for example, monitoring similar entities (e.g., relevant users, relevant deployments, etc.) and identifying one or more patterns that trigger one or more common actions. Such actions can also include feeding data extracted from a local user device (e.g., via an intelligent backup and restoration tool) into an application enquiry repository and determining one or more potential options to be selected in connection with the current state of the user. In one or more embodiments, the user's current state (also referred to herein as the user's current context) can includes active applications, device settings, recent actions, and metadata pertaining to planned and/or ongoing tasks. Taking into account the user's current needs, preferences and/or program usage patterns, the user's current state can be used to help identify relevant backup and/or restore options, facilitating effective data recovery and/or synchronization based on the user's needs.

Further, such actions can include monitoring changes in the metadata uploaded to a domain repository and domain expertise enquiry repository, triggering reevaluation of at least a portion of the one or more options for the user. Also, such actions can include ranking the one or more options based at least in part on the potential benefits associated therewith and requests for user approval to proceed with the option(s). Based on the user approval and the degree of detail to be shared, at least one embodiment can include proceeding with the next course of action associated with the one or more options.

In one or more embodiments, a user persona repository (for example, part of user-application configuration data structures 107 in the FIG. 1 embodiment) can be implemented to help personalize experiences and enhance user satisfaction by capturing and analyzing user context attributes from application transactional data. Leveraging such a user persona repository enables generating and/or prioritizing tailored content and/or recommendations based at least in part on user preferences and user behavior. Such an embodiment can include identifying relevant application transactional data, defining one or more user persona attributes to capture within the identified data, and creating one or more user profiles based on at least in part on messaging analytics, encompassing at least a portion of the one or more user persona attributes. At least one embodiment can also include continuously updating one or more portions of the user profile(s) with real-time transactional data.

As also detailed herein, one or more embodiments include generating and/or implementing intelligent restoration services. When a user moves to a new device or starts a new session in a shared device, new application data is to be added to an inventory, and there is often insufficient historical data to generate accurate recommendations for the application data. Accordingly, when a user is accessing an application, at least one embodiment can include connecting to and/or leveraging one or more large language model (LLM) restoration services, for example, by providing a reference to the given user profile and the given application profile. The LLM restoration services computes an intersection of interests by finding an intersection between the user profile and application profile. This can involve identifying and/or collecting common portions from the user and the application profiles. For example, in a scenario wherein the user is setting up a new laptop, then the intersection can include signatures (e.g., synchronizing previous signatures which were available in a previous version of the application on a different/previous device) as well as date and time settings (e.g., aligning the widget of date and time based on the time zone and working hours).

By way of example and illustration, consider a scenario wherein a user is logging in to an application for the first time. In accordance with one or more embodiments, intelligent restoration services, as detailed herein, would then create a set of possibilities for restoration of application data. In creating such a set of possibilities, at least one embodiment can include generating and outputting, using at least one LLM, various questions. The questions can be of multiple types, such as, for example, questions eliciting a yes response (e.g., "will you be restoring tasks from the operating system?"), questions eliciting a no response (e.g., "will you be creating your application profile?"), questions implying a contradiction of role (e.g., "you will need additional user privileges; do you already have the privileges?"), and questions confirming a role (e.g., "you will need customized data restoration controls, correct?").

Additionally, in such an example embodiment, the user is navigated through the set of questions to access the knowledge and scope of operations, and the answers to the questions are processed by the intelligent restoration services. Based at least in part on the processing of these answers, the state of the user is determined and cached for a designated amount of time. In one or more embodiments, the user state is updated and/or refreshed based on subsequent question and answer exchanges. Further, additional context can be built based, for example, on one or more usage patterns (e.g., APIs used, entities accessed, time taken, etc.) for the user, and such information can be augmented into the user profile.

At least one embodiment also includes generating and maintaining a user profile datastore. As the user performs actions on an application, additional descriptions are added to the user profile datastore that capture one or more specific usage patterns of the user pertaining to how the user utilizes the application. Application descriptions can also be updated based at least in part on the operations of the collective users that are using the application. Accordingly, if, for example, a particular user is accessing a part of application unused by other users, it can be determined that the particular user is introducing a new behavior. Further, in one or more embodiments, intelligent restoration services can continuously monitor usage patterns and can add additional descriptions with respect to the application and/or one or more users using restrictive information (e.g., specific APIs, time durations, etc.).

When an operation is performed by a user (e.g., a first time delete of a project), the operation can provide graded validation of user intent. More particularly, there can be different types of deployment (e.g., hosted environment, user access, etc.), and each type can have their own profile repository. Additionally, services can be provided with access to each corresponding datastore, in which case at least one LLM can select and/or determine the intersection of profiles. This can ensure, for example, that certain types of behaviors enforced across users are taken into account for introduction of new behavior.

Figure 2:
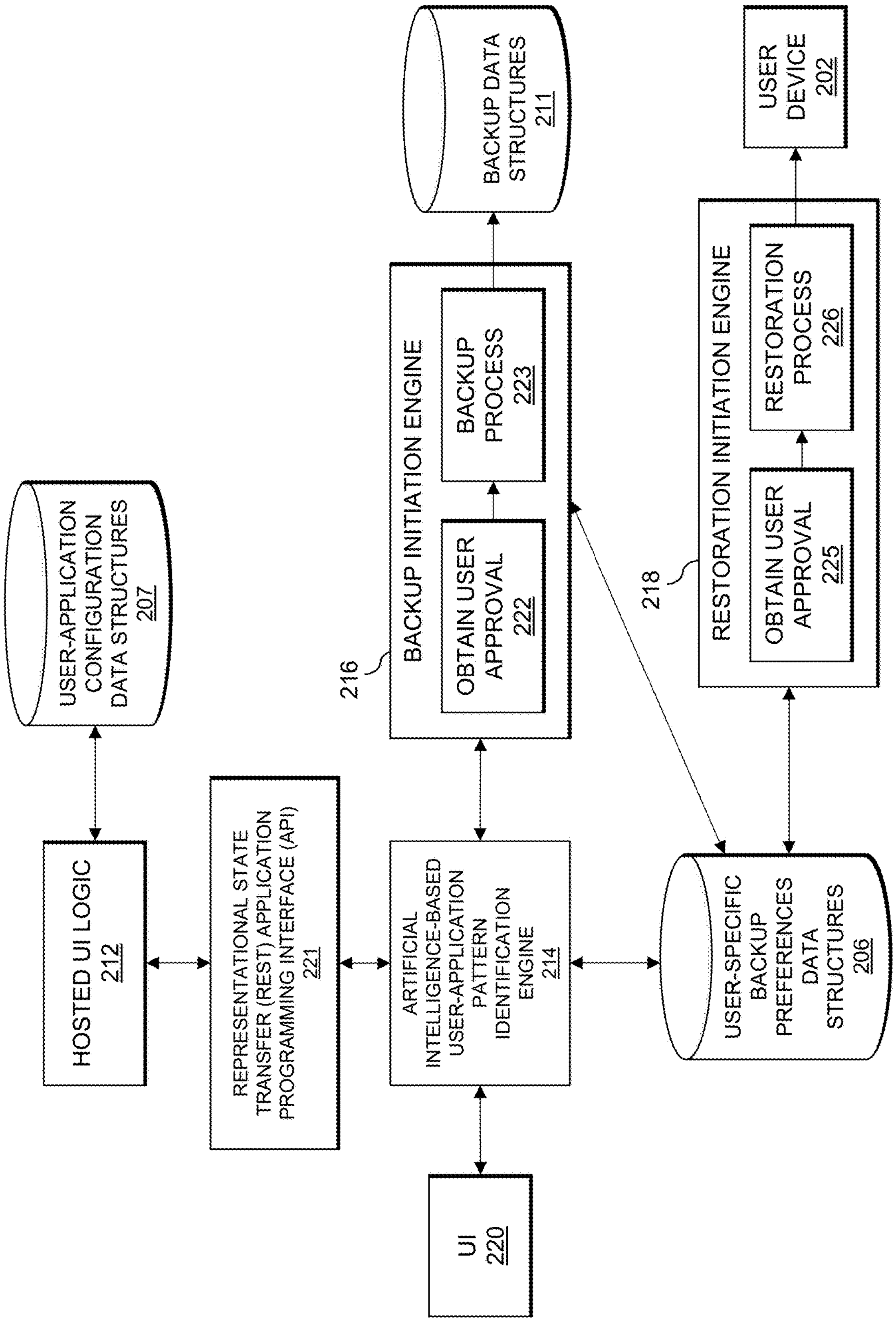
FIG. 2 shows example system architecture in an illustrative embodiment.

FIG. 2 shows example system architecture in an illustrative embodiment. By way of illustration, FIG. 2 depicts artificial intelligence-based user-application pattern identification engine 214 obtaining and/or processing data provided via UI 220. In the example embodiment depicted in FIG. 2, UI 220 refers to the UI through which the user interacts to access the backup and restore features on their device (e.g., user device 202). The data passed from UI 220 to the artificial intelligence-based user-application pattern identification engine 214 can include, for example, user inputs such as preferences for backup and/or restoration operations, applications and/or directories to include or exclude, operation frequency information, storage location, information, etc. The data passed from UI 220 to the artificial intelligence-based user-application pattern identification engine 214 can also include, e.g., usage patterns metadata related to user actions, application interaction sequences, commonly used settings, operational habits, etc. Further, the data passed from UI 220 to the artificial intelligence-based user-application pattern identification engine 214 can include, for example, system state information about the user's device, application configurations, current tasks, previous backups, etc., as well as intent information including choices reflecting the user's intent (e.g., "restore from last backup," "migrate settings to a new device," etc.).

Additionally, artificial intelligence-based user-application pattern identification engine 214 interacts with hosted UI logic 212 via representational state transfer (REST) API 221. Also, based at least in part on such interactions, hosted UI logic 212 stores data pertaining to patterns, identified by artificial intelligence-based user-application pattern identification engine 214, in user-application configuration data structures 207. As detailed herein, user-application configuration data structures 207 can store data, for example, pertaining to the manner in which one or more users back up information for one or more specific applications, and user-application configuration data structures 207 can serve as a central database for such information. This can ensure, e.g., that backup processes involving the same application remain consistent across different devices.

Referring again to FIG. 2, artificial intelligence-based user-application pattern identification engine 214 outputs data to backup initiation engine 216 and user-specific backup preferences data structures 206. Based at least in part on the data provided by artificial intelligence-based user-application pattern identification engine 214, backup initiation engine 216 carries out steps including obtaining user approval for one or more backup processes in step 222, and automatically executing the one or more backup processes (e.g., upon receipt of user approval) in step 223, which includes storing the relevant data in one or more backup data structures 211 (e.g., a secure cloud storage system). Additionally, as depicted in FIG. 2, data pertaining to user selections made as part of step 222 can be stored in user-specific backup preferences data structures 206, as can data pertaining to successful backup operations carried out as part of step 223.

Also, as depicted in FIG. 2, restoration initiation engine 218 can, based at least in part on the data from user-specific backup preferences data structures 206, carries out steps including obtaining user approval for one or more restoration processes in step 225, and automatically executing the one or more restoration processes (e.g., upon receipt of user approval) in step 226, which includes retrieving the relevant data from backup data structures 211 and providing the data to user device 202.

Further, detailed below are descriptions of example pseudocode of training and executing an artificial intelligence-based user-application pattern identification engine (e.g., element 214 in FIG. 2) implemented in connection with a hosted UI logic component (e.g., element 212 in FIG. 2). In a training phase (depicted in FIG. 3 through FIG. 6), at least one embodiment includes identifying UI usage patterns by analyzing user interaction data such as, e.g., navigation sequences, preferred UI configurations and frequently accessed features. In the example embodiment depicted in FIG. 3 through FIG. 10, a sequence-to-sequence (seq2seq) model is trained and implemented to learn user preferences and adapt UI elements accordingly.

FIG. 3 shows example pseudocode for implementing data collection techniques in connection with training an artificial intelligence-based user-application pattern identification engine in an illustrative embodiment. In this embodiment, example pseudocode 300 is executed by or under the control of at least one processing system and/or device. For example, the example pseudocode 300 may be viewed as comprising a portion of a software implementation of at least part of automated backup and restoration system 105 of the FIG. 1 embodiment.

The example pseudocode 300 illustrates collecting user interaction metadata, such as clicks, selections, navigation paths, etc., from user sessions. It is to be appreciated that this particular example pseudocode shows just one example implementation of data collection techniques in connection with training an artificial intelligence-based user-application pattern identification engine, and alternative implementations can be used in other embodiments.

FIG. 4 shows example pseudocode for implementing data preprocessing techniques in connection with training an artificial intelligence-based user-application pattern identification engine in an illustrative embodiment. In this embodiment, example pseudocode 400 is executed by or under the control of at least one processing system and/or device. For example, the example pseudocode 400 may be viewed as comprising a portion of a software implementation of at least part of automated backup and restoration system 105 of the FIG. 1 embodiment.

The example pseudocode 400 illustrates normalizing and encoding at least a portion of the captured data for model compatibility. It is to be appreciated that this particular example pseudocode shows just one example implementation of data preprocessing techniques in connection with training an artificial intelligence-based user-application pattern identification engine, and alternative implementations can be used in other embodiments.

FIG. 5 shows example pseudocode for training at least a portion of an artificial intelligence-based user-application pattern identification engine in an illustrative embodiment. In this embodiment, example pseudocode 500 is executed by or under the control of at least one processing system and/or device. For example, the example pseudocode 500 may be viewed as comprising a portion of a software implementation of at least part of automated backup and restoration system 105 of the FIG. 1 embodiment.

The example pseudocode 500 illustrates training a seq2seq model to learn interaction patterns and UI preferences of the user. Such training can include defining an optimizer, a loss function, and a number of epochs.

It is to be appreciated that this particular example pseudocode shows just one example implementation of training at least a portion of an artificial intelligence-based user-application pattern identification engine, and alternative implementations can be used in other embodiments.

Figure 6:
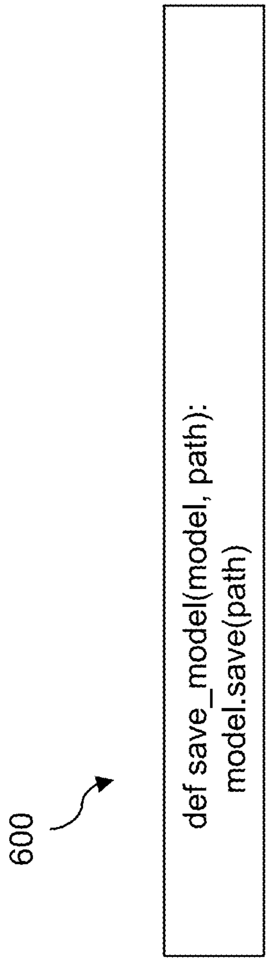
FIG. 6 shows example pseudocode for persisting at least a portion of a trained artificial intelligence-based user-application pattern identification engine in an illustrative embodiment.

FIG. 6 shows example pseudocode for persisting at least a portion of the trained artificial intelligence-based user-application pattern identification engine in an illustrative embodiment. In this embodiment, example pseudocode 600 is executed by or under the control of at least one processing system and/or device. For example, the example pseudocode 600 may be viewed as comprising a portion of a software implementation of at least part of automated backup and restoration system 105 of the FIG. 1 embodiment.

The example pseudocode 600 illustrates saving the trained model for future inferences. It is to be appreciated that this particular example pseudocode shows just one example implementation of persisting at least a portion of the trained artificial intelligence-based user-application pattern identification engine, and alternative implementations can be used in other embodiments.

Additionally, FIG. 7 through FIG. 10 depict an example execution phase of the model trained in FIG. 3 through FIG. 6.

FIG. 7 shows example pseudocode for loading at least a portion of the trained artificial intelligence-based user-application pattern identification engine in an illustrative embodiment. In this embodiment, example pseudocode 700 is executed by or under the control of at least one processing system and/or device. For example, the example pseudocode 700 may be viewed as comprising a portion of a software implementation of at least part of automated backup and restoration system 105 of the FIG. 1 embodiment.

The example pseudocode 700 illustrates loading the pre-trained UI logic model. It is to be appreciated that this particular example pseudocode shows just one example implementation of loading at least a portion of the trained artificial intelligence-based user-application pattern identification engine, and alternative implementations can be used in other embodiments.

FIG. 8 shows example pseudocode for capturing input data in connection with implementing at least a portion of the trained artificial intelligence-based user-application pattern identification engine in an illustrative embodiment. In this embodiment, example pseudocode 800 is executed by or under the control of at least one processing system and/or device. For example, the example pseudocode 800 may be viewed as comprising a portion of a software implementation of at least part of automated backup and restoration system 105 of the FIG. 1 embodiment.

The example pseudocode 800 illustrates capturing real-time user interaction data by monitoring real-time UI actions and extracting relevant metadata and/or features. It is to be appreciated that this particular example pseudocode shows just one example implementation of capturing input data in connection with implementing at least a portion of the trained artificial intelligence-based user-application pattern identification engine, and alternative implementations can be used in other embodiments.

FIG. 9 shows example pseudocode for predicting UI adjustments using the trained artificial intelligence-based user-application pattern identification engine in an illustrative embodiment. In this embodiment, example pseudocode 900 is executed by or under the control of at least one processing system and/or device. For example, the example pseudocode 900 may be viewed as comprising a portion of a software implementation of at least part of automated backup and restoration system 105 of the FIG. 1 embodiment.

The example pseudocode 900 illustrates using the trained model to predict UI adjustments based at least in part on current user interactions. It is to be appreciated that this particular example pseudocode shows just one example implementation of predicting UI adjustments using the trained artificial intelligence-based user-application pattern identification engine, and alternative implementations can be used in other embodiments.

FIG. 10 shows example pseudocode for dynamically reconfiguring UI layout based on artificial intelligence-based predictions in an illustrative embodiment. In this embodiment, example pseudocode 1000 is executed by or under the control of at least one processing system and/or device. For example, the example pseudocode 1000 may be viewed as comprising a portion of a software implementation of at least part of automated backup and restoration system 105 of the FIG. 1 embodiment.

The example pseudocode 1000 illustrates updating a UI layout by dynamically reconfiguring one or more portions of the UI layout and/or appearance based at least in part on the model predictions. It is to be appreciated that this particular example pseudocode shows just one example implementation of dynamically reconfiguring UI layer based on artificial intelligence-based predictions, and alternative implementations can be used in other embodiments.

As detailed herein, one or more embodiments include implementing one or more central databases, which ensures that a backup process for a particular application remains consistent across various devices. More particularly, in such an embodiment, implementing of centralized backup logic facilitates enhanced and/or more efficient management of backup policies, configurations, and access controls.

Additionally, at least one embodiment includes integrating with an application management system to provide real-time updates on software versions and recommended upgrades for enhanced security and performance. Also, in such an embodiment, a backup process can be initiated selectively for multiple applications, avoiding unnecessary use of resources, improving efficiency, and reducing and/or minimizing impact on system performance.

Further, as detailed herein, one or more embodiments include implementing intelligent backup and restoration techniques which add intelligence to the backup process by focusing on user-specific settings, user-specific behaviors, intent-based restorations, and cross-application data preservation. For example, in connection with such techniques, users can restore their entire working environment, as such an embodiment includes intelligently analyzing the user's intent and restores not just files, but the entire working environment, ensuring seamless continuity of the user experience. Such artificial intelligence-based analysis can include, for example, user-specific personalized configurations and settings across multiple applications, ensuring that the user's working environment is fully restored to its original and/or previous state.

Figure 11:
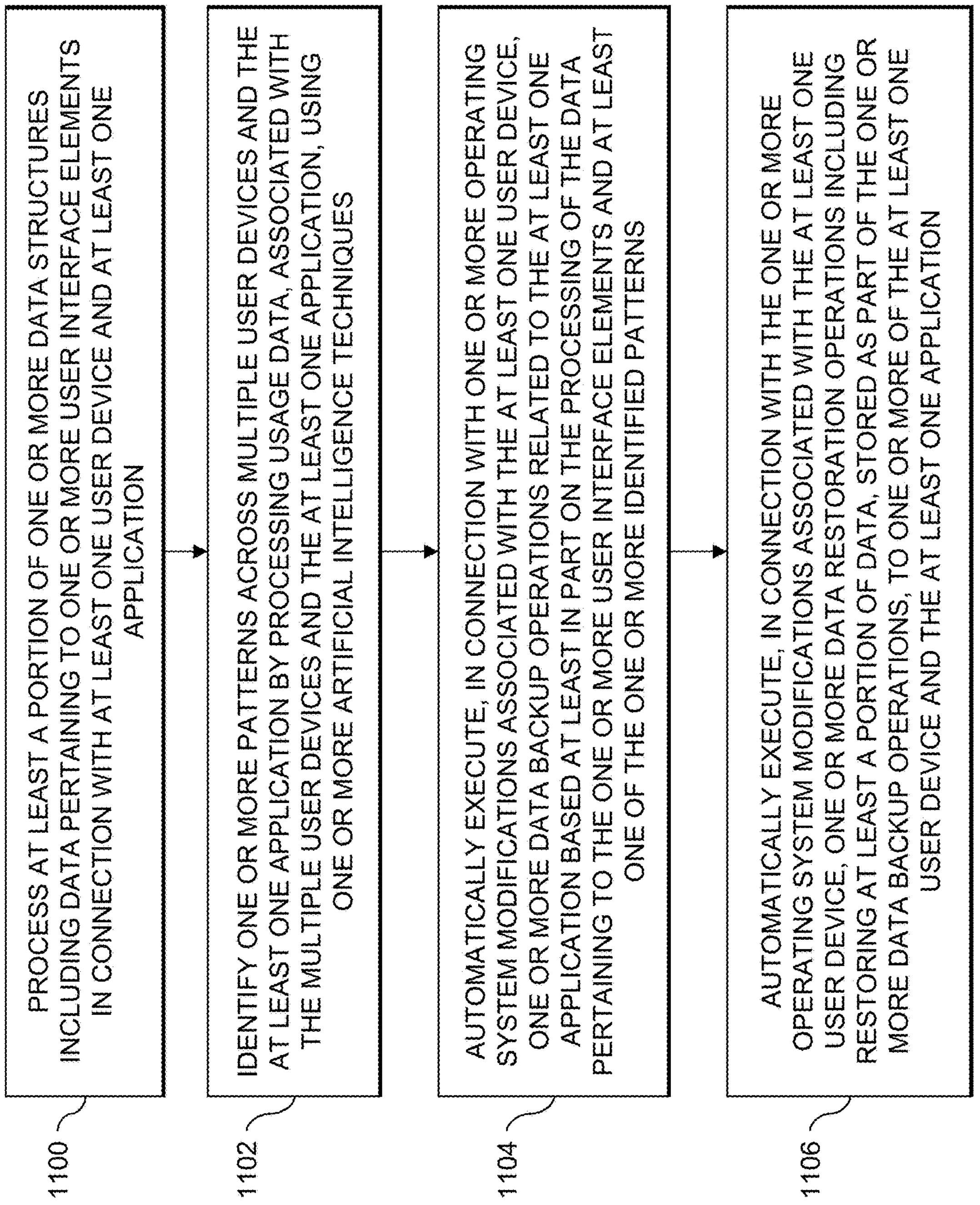
FIG. 11 is a flow diagram of configuring and implementing operating system backup and restoration operations using artificial intelligence techniques in an illustrative embodiment.

FIG. 11 is a flow diagram of a process for configuring and implementing operating system backup and restoration operations using artificial intelligence techniques in an illustrative embodiment. It is to be understood that this particular process is only an example, and additional or alternative processes can be carried out in other embodiments.

In this embodiment, the process includes steps 1100 through 1106. These steps are assumed to be performed by the automated backup and restoration system 105 utilizing elements 112, 114, 116 and 118.

Step 1100 includes processing at least a portion of one or more data structures comprising data pertaining to one or more user interface elements in connection with at least one user device and at least one application. In at least one embodiment, processing at least a portion of the one or more data structures comprising data pertaining to one or more user interface elements includes determining one or more of appearance of at least a portion of the one or more user interface elements and arrangement of at least a portion of the one or more user interface elements.

Step 1102 includes identifying one or more patterns across multiple user devices and the at least one application by processing usage data, associated with the multiple user devices and the at least one application, using one or more artificial intelligence techniques. In one or more embodiments, processing usage data associated with the multiple user devices and the at least one application comprises processing the usage data using at least one LLM. In such an embodiment, the at least one LLM can include, for example, one or more bidirectional encoder representations from transformers (BERT) models, one or more generative pre-trained transformer (GPT) models, one or more autoregressive language models, one or more encoder-decoder models, one or more zero-shot models, one or more instruction-tuned language models, etc.

Additionally or alternatively, identifying one or more patterns can include identifying one or more patterns related to one or more types of data stored in association with at least a portion of the multiple user devices as part of one or more backup operations related to the at least one application, identifying one or more patterns related to one or more of timing of the one or more data backup operations and frequency of the one or more data backup operations, and/or identifying one or more patterns related to one or more of timing of the one or more data restoration operations and frequency of the one or more data restoration operations.

Step 1104 includes automatically executing, in connection with one or more operating system modifications associated with the at least one user device, one or more data backup operations related to the at least one application based at least in part on the processing of the data pertaining to the one or more user interface elements and at least one of the one or more identified patterns. In at least one embodiment, automatically executing one or more data backup operations includes automatically storing, in one or more data structures, one or more user-designated settings of the at least one application.

Step 1106 includes automatically executing, in connection with the one or more operating system modifications associated with the at least one user device, one or more data restoration operations comprising restoring at least a portion of data, stored as part of the one or more data backup operations, to one or more of the at least one user device and the at least one application. In one or more embodiments, restoring at least a portion of data to one or more of the at least one user device and the at least one application includes restoring the at least a portion of the data in accordance with one or more of the determined appearance of the at least a portion of the one or more user interface elements and the determined arrangement of the at least a portion of the one or more user interface elements. Additionally or alternatively, automatically executing one or more data restoration operations can include automatically executing the one or more data restoration operations based at least in part on the processing of the data pertaining to the one or more user interface elements and at least one of the one or more identified patterns.

Additionally, in at least one embodiment, the techniques depicted in FIG. 11 also include automatically training at least a portion of the one or more artificial intelligence techniques using feedback related to one or more of results from the one or more data backup operations and results from the one or more data restoration operations.

Accordingly, the particular processing operations and other functionality described in conjunction with the flow diagram of FIG. 11 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to perform operating system backup and restoration using artificial intelligence techniques. These and other embodiments can effectively overcome problems associated with errors, latencies, and resource-intensive corrective actions.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 12 and 13. Although described in the context of system 100, these platforms may also be used to implement at least portions of other information processing systems in other embodiments.

Figure 12:
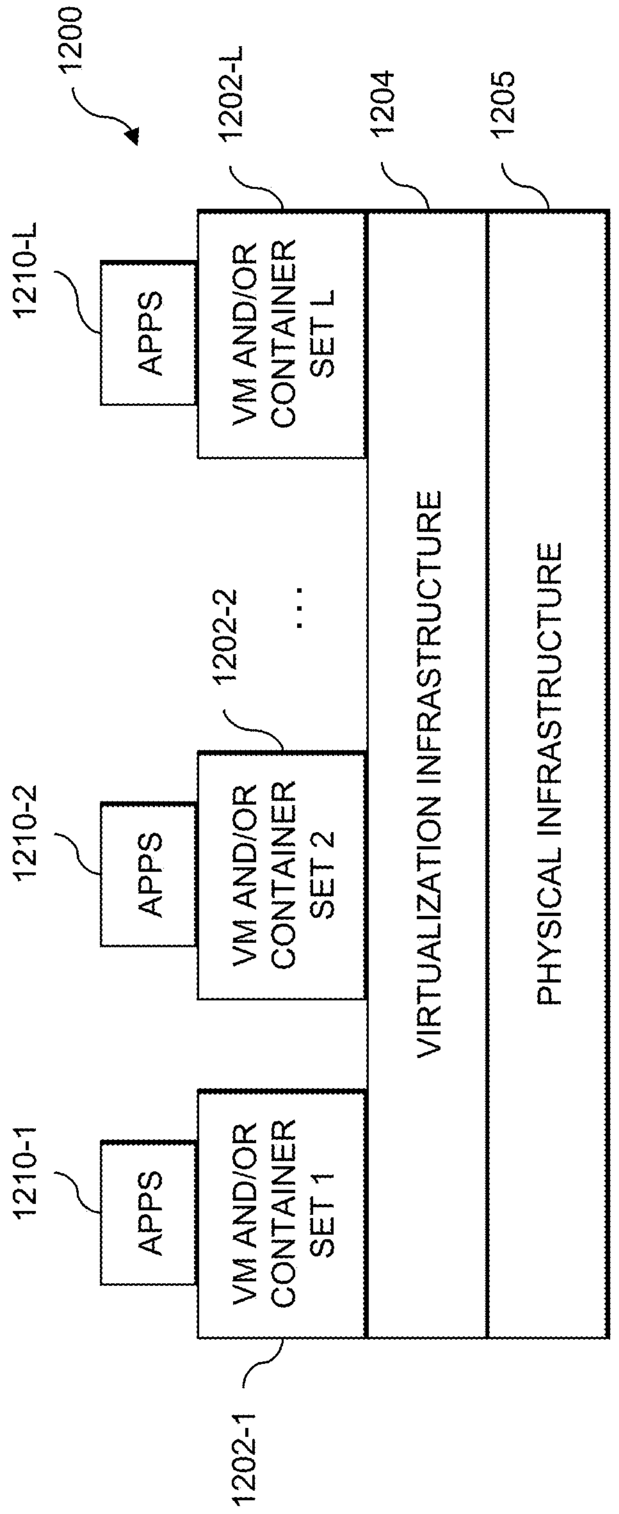
FIGS. 12 and 13 show examples of processing platforms that may be utilized to implement at least a portion of an information processing system in illustrative embodiments.
Figure 13:
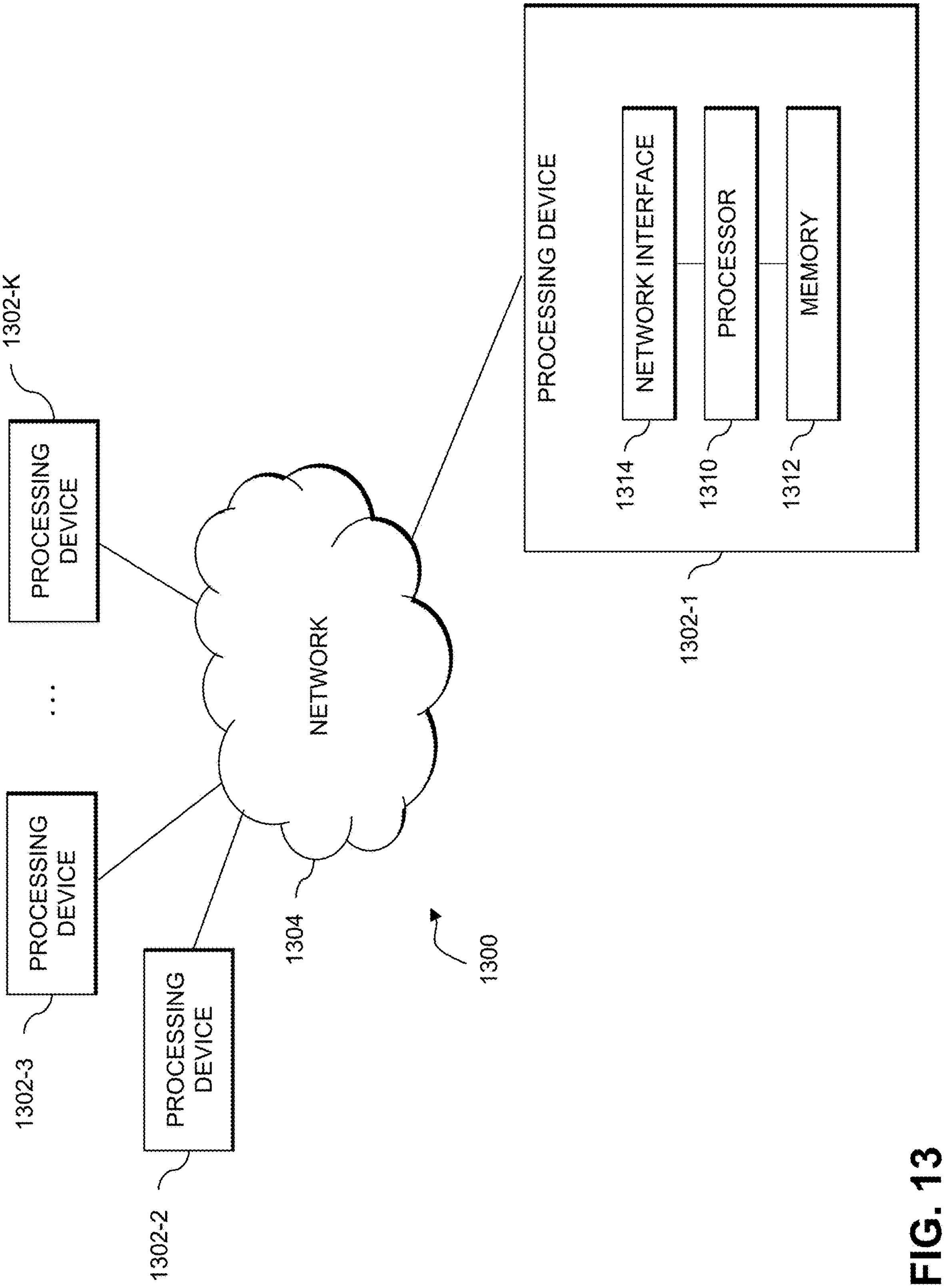

FIG. 12 shows an example processing platform comprising cloud infrastructure 1200. The cloud infrastructure 1200 comprises a combination of physical and virtual processing resources that are utilized to implement at least a portion of the information processing system 100. The cloud infrastructure 1200 comprises multiple virtual machines (VMs) and/or container sets 1202-1, 1202-2, . . . 1202-L implemented using virtualization infrastructure 1204. The virtualization infrastructure 1204 runs on physical infrastructure 1205, and illustratively comprises one or more hypervisors and/or operating system level virtualization infrastructure. The operating system level virtualization infrastructure illustratively comprises kernel control groups of a Linux operating system or other type of operating system.

The cloud infrastructure 1200 further comprises sets of applications 1210-1, 1210-2, . . . 1210-L running on respective ones of the VMs/container sets 1202-1, 1202-2, . . . 1202-L under the control of the virtualization infrastructure 1204. The VMs/container sets 1202 comprise respective VMs, respective sets of one or more containers, or respective sets of one or more containers running in VMs. In some implementations of the FIG. 12 embodiment, the VMs/container sets 1202 comprise respective VMs implemented using virtualization infrastructure 1204 that comprises at least one hypervisor.

A hypervisor platform may be used to implement a hypervisor within the virtualization infrastructure 1204, wherein the hypervisor platform has an associated virtual infrastructure management system. The underlying physical machines comprise one or more information processing platforms that include one or more storage systems.

In other implementations of the FIG. 12 embodiment, the VMs/container sets 1202 comprise respective containers implemented using virtualization infrastructure 1204 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 1200 shown in FIG. 12 may represent at least a portion of one processing platform. Another example of such a processing platform is processing platform 1300 shown in FIG. 13.

The processing platform 1300 in this embodiment comprises a portion of system 100 and includes a plurality of processing devices, denoted 1302-1, 1302-2, 1302-3, . . . 1302-K, which communicate with one another over a network 1304.

The network 1304 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 1302-1 in the processing platform 1300 comprises a processor 1310 coupled to a memory 1312.

The processor 1310 comprises a microprocessor, an ASIC, an SOC, an FPGA, a CPU, a GPU, an NPU, a DPU, a TPU, an ALU, a DSP, and/or other similar processing device components, as well as other types and arrangements of processing circuitry, in any combination. At least a portion of the functionality of at least one artificial intelligence system and its associated artificial intelligence algorithms provided by one or more processing devices as disclosed herein can be implemented using such circuitry.

The memory 1312 comprises RAM, ROM or other types of memory, in any combination. The memory 1312 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1302-1 is network interface circuitry 1314, which is used to interface the processing device with the network 1304 and other system components, and may comprise conventional transceivers.

The other processing devices 1302 of the processing platform 1300 are assumed to be configured in a manner similar to that shown for processing device 1302-1 in the figure.

Again, the particular processing platform 1300 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of an information processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:

processing at least a portion of one or more data structures comprising data pertaining to one or more user interface elements in connection with at least one user device and at least one application;

identifying patterns across multiple user devices and the at least one application by processing usage data, associated with the multiple user devices and the at least one application, using one or more artificial intelligence techniques, wherein identifying the patterns comprises identifying patterns related to temporal duration of one or more data backup operations, frequency of the one or more data backup operations, temporal duration of one or more data restoration operations and frequency of the one or more data restoration operations;

automatically executing, in connection with one or more operating system modifications associated with the at least one user device, the one or more data backup operations related to the at least one application based at least in part on the processing of the data pertaining to the one or more user interface elements and at least one of the one or more identified patterns; and automatically executing, in connection with the one or more operating system modifications associated with the at least one user device, the one or more data restoration operations comprising restoring at least a portion of data, stored as part of the one or more data backup operations, to one or more of the at least one user device and the at least one application;

wherein the method is performed by at least one processing device comprising a processor coupled to a memory.

2. The computer-implemented method of claim 1, wherein processing usage data associated with the multiple user devices and the at least one application comprises processing the usage data using at least one large language model (LLM).

3. The computer-implemented method of claim 1, wherein processing at least a portion of the one or more data structures comprising data pertaining to one or more user interface elements comprises determining one or more of appearance of at least a portion of the one or more user interface elements and arrangement of at least a portion of the one or more user interface elements.

4. The computer-implemented method of claim 3, wherein restoring at least a portion of data to one or more of the at least one user device and the at least one application comprises restoring the at least a portion of the data in accordance with one or more of the determined appearance of the at least a portion of the one or more user interface elements and the determined arrangement of the at least a portion of the one or more user interface elements.

5. The computer-implemented method of claim 1, wherein identifying patterns comprises identifying patterns related to one or more types of data stored in association with at least a portion of the multiple user devices as part of one or more backup operations related to the at least one application.

6. The computer-implemented method of claim 1, wherein automatically executing one or more data backup operations comprises automatically storing, in one or more data structures, one or more user-designated settings of the at least one application.

7. The computer-implemented method of claim 1, wherein automatically executing one or more data restoration operations comprises automatically executing the one or more data restoration operations based at least in part on the processing of the data pertaining to the one or more user interface elements and at least one of the one or more identified patterns.

8. The computer-implemented method of claim 1, further comprising:

automatically training at least a portion of the one or more artificial intelligence techniques using feedback related to one or more of results from the one or more data backup operations and results from the one or more data restoration operations.

9. A non-transitory processor-readable storage medium having stored therein program code of one or more software programs, wherein the program code when executed by at least one processing device causes the at least one processing device:

to process at least a portion of one or more data structures comprising data pertaining to one or more user interface elements in connection with at least one user device and at least one application;

to identify patterns across multiple user devices and the at least one application by processing usage data, associated with the multiple user devices and the at least one application, using one or more artificial intelligence techniques, wherein identifying the patterns comprises identifying patterns related to temporal duration of one or more data backup operations, frequency of the one or more data backup operations, temporal duration of one or more data restoration operations and frequency of the one or more data restoration operations;

to automatically execute, in connection with one or more operating system modifications associated with the at least one user device, the one or more data backup operations related to the at least one application based at least in part on the processing of the data pertaining to the one or more user interface elements and at least one of the one or more identified patterns; and to automatically execute, in connection with the one or more operating system modifications associated with the at least one user device, the one or more data restoration operations comprising restoring at least a portion of data, stored as part of the one or more data backup operations, to one or more of the at least one user device and the at least one application.

10. The non-transitory processor-readable storage medium of claim 6, wherein processing usage data associated with the multiple user devices and the at least one application comprises processing the usage data using at least one LLM.

11. The non-transitory processor-readable storage medium of claim 9, wherein processing at least a portion of the one or more data structures comprising data pertaining to one or more user interface elements comprises determining one or more of appearance of at least a portion of the one or more user interface elements and arrangement of at least a portion of the one or more user interface elements.

12. The non-transitory processor-readable storage medium of claim 11, wherein restoring at least a portion of data to one or more of the at least one user device and the at least one application comprises restoring the at least a portion of the data in accordance with one or more of the determined appearance of the at least a portion of the one or more user interface elements and the determined arrangement of the at least a portion of the one or more user interface elements.

13. The non-transitory processor-readable storage medium of claim 9, wherein identifying patterns comprises identifying patterns related to one or more types of data stored in association with at least a portion of the multiple user devices as part of one or more backup operations related to the at least one application.

14. An apparatus comprising:

at least one processing device comprising a processor coupled to a memory;

the at least one processing device being configured:

to process at least a portion of one or more data structures comprising data pertaining to one or more user interface elements in connection with at least one user device and at least one application;

to identify patterns across multiple user devices and the at least one application by processing usage data, associated with the multiple user devices and the at least one application, using one or more artificial intelligence techniques, wherein identifying the patterns comprises identifying patterns related to temporal duration of one or more data backup operations, frequency of the one or more data backup operations, temporal duration of one or more data restoration operations and frequency of the one or more data restoration operations;

to automatically execute, in connection with one or more operating system modifications associated with the at least one user device, the one or more data backup operations related to the at least one application based at least in part on the processing of the data pertaining to the one or more user interface elements and at least one of the one or more identified patterns; and to automatically execute, in connection with the one or more operating system modifications associated with the at least one user device, the one or more data restoration operations comprising restoring at least a portion of data, stored as part of the one or more data backup operations, to one or more of the at least one user device and the at least one application.

15. The apparatus of claim 14, wherein processing usage data associated with the multiple user devices and the at least one application comprises processing the usage data using at least one LLM.

16. The apparatus of claim 14, wherein processing at least a portion of the one or more data structures comprising data pertaining to one or more user interface elements comprises determining one or more of appearance of at least a portion of the one or more user interface elements and arrangement of at least a portion of the one or more user interface elements.

17. The apparatus of claim 16, wherein restoring at least a portion of data to one or more of the at least one user device and the at least one application comprises restoring the at least a portion of the data in accordance with one or more of the determined appearance of the at least a portion of the one or more user interface elements and the determined arrangement of the at least a portion of the one or more user interface elements.

18. The apparatus of claim 14, wherein identifying patterns comprises identifying patterns related to one or more types of data stored in association with at least a portion of the multiple user devices as part of one or more backup operations related to the at least one application.

19. The apparatus of claim 14, wherein automatically executing one or more data backup operations comprises automatically storing, in one or more data structures, one or more user-designated settings of the at least one application.

20. The apparatus of claim 14, wherein automatically executing one or more data restoration operations comprises automatically executing the one or more data restoration operations based at least in part on the processing of the data pertaining to the one or more user interface elements and at least one of the one or more identified patterns.

* * * * *